(12) United States Patent
Mokari et al.

(10) Patent No.: US 8,003,021 B2
(45) Date of Patent: Aug. 23, 2011

(54) SYNTHESIS OF PB ALLOY AND CORE/SHELL NANOWIRES

(75) Inventors: Taleb Mokari, Berkeley, CA (US);
Minjuan Zhang, Ann Arbor, MI (US);
Peidong Yang, Berkeley, CA (US)

(73) Assignees: Toyota Motor Engineering and Manufacturing North America, Inc., Erlanger, KY (US); The Regents of the University of California, Oakland, CA (US)

( * ) Notice: Subject to any disclaimer, the term of this patent is extended or adjusted under 35 U.S.C. 154(b) by 957 days.

(21) Appl. No.: 11/937,225

(22) Filed: Nov. 8, 2007

(65) Prior Publication Data

US 2011/0001096 A1    Jan. 6, 2011

(51) Int. Cl.
*H01B 1/02* (2006.01)
*C01B 19/00* (2006.01)

(52) U.S. Cl. .................. 252/519.4; 977/762; 423/508

(58) Field of Classification Search ............ 252/512, 252/591.4; 423/92, 508; 977/762; 438/930, 438/962
See application file for complete search history.

(56) References Cited

U.S. PATENT DOCUMENTS

| | | | |
|---|---|---|---|
| 6,126,740 A | 10/2000 | Schulz et al. | |
| 6,489,704 B1 | 12/2002 | Kucherov et al. | |
| 6,794,265 B2 | 9/2004 | Lee et al. | |
| 6,815,064 B2 | 11/2004 | Treadway et al. | |
| 6,819,692 B2 | 11/2004 | Klimov et al. | |
| 6,819,845 B2 | 11/2004 | Lee et al. | |
| 6,824,974 B2 | 11/2004 | Pisharody et al. | |
| 6,872,450 B2 | 3/2005 | Liu et al. | |
| 6,876,976 B1 | 4/2005 | Setteducati | |
| 6,878,871 B2 | 4/2005 | Scher et al. | |
| 7,042,003 B2 | 5/2006 | Jang et al. | |
| 7,054,513 B2 | 5/2006 | Herz et al. | |
| 7,087,832 B2 | 8/2006 | Scher et al. | |
| 7,102,152 B2 | 9/2006 | Chua et al. | |
| 7,147,684 B2 * | 12/2006 | Anderson et al. | 55/385.1 |
| 7,150,910 B2 | 12/2006 | Eisler et al. | |
| 7,172,791 B2 | 2/2007 | Treadway et al. | |
| 7,181,266 B2 | 2/2007 | Frangioni et al. | |
| 7,226,953 B1 | 6/2007 | Petruska et al. | |
| 7,228,050 B1 | 6/2007 | Buretea et al. | |
| 7,229,690 B2 | 6/2007 | Chan et al. | |
| 7,255,846 B2 | 8/2007 | Ren et al. | |
| 7,534,488 B2 * | 5/2009 | Alivisatos et al. | 428/402 |
| 7,591,913 B2 * | 9/2009 | Ren et al. | 148/512 |
| 2004/0095658 A1 | 5/2004 | Buretea et al. | |
| 2005/0072989 A1 | 4/2005 | Bawendi et al. | |
| 2005/0150541 A1 | 7/2005 | Scher et al. | |
| 2005/0266246 A1 | 12/2005 | Reiss et al. | |
| 2006/0019098 A1 | 1/2006 | Chan et al. | |
| 2006/0097247 A1 | 5/2006 | Kim et al. | |
| 2006/0240227 A1 | 10/2006 | Zhang et al. | |

(Continued)

OTHER PUBLICATIONS

Mokari et al "Shape, Size and Assembly Control of PbTe Nanocrystals", J. Am. Chem. Soc. 2007, 129, 9864-65.*

(Continued)

*Primary Examiner* — Mark Kopec
(74) *Attorney, Agent, or Firm* — Dinsmore & Shohl LLP

(57) ABSTRACT

Embodiments of the present invention are directed to methods of producing $PbSe_xY_{1-x}$ alloys and methods of producing PbSe/PbY core/shell nanowires. The method of producing $PbSe_xY_{1-x}$ alloys comprise providing PbSe nanowires, producing a PbY solution where Y=S or Te, adding the PbSe nanowires to an growth solution, and producing $PbSe_xY_{1-x}$ nanowire alloys by adding the PbY solution to the heated growth solution comprising PbSe nanowires.

9 Claims, 7 Drawing Sheets

U.S. PATENT DOCUMENTS

| | | |
|---|---|---|
| 2006/0244367 A1 | 11/2006 | Im et al. |
| 2007/0020400 A1 | 1/2007 | Chang |
| 2007/0063154 A1 | 3/2007 | Chen et al. |
| 2007/0121023 A1 | 5/2007 | Yang |
| 2007/0122101 A1 | 5/2007 | Buretea et al. |
| 2007/0151597 A1 | 7/2007 | Chen et al. |
| 2007/0160747 A1 | 7/2007 | Mitzi et al. |
| 2007/0170446 A1 | 7/2007 | Cho et al. |

OTHER PUBLICATIONS

Cho, Kyung-Sang et al, "Designing PbSe Nanowires and Nanorings through Oriented Attachment of Nanopoarticles".

Brumer, M. et al; "PbSe/PbS and PbSe/PbSexS1-x Core/Shell Nanocrystals"; Advanced Functional Materials; 2005; 15; 1111-1116.

* cited by examiner

SYNTHESIS OF PB ALLOY AND CORE/SHELL NANOWIRES

TECHNICAL FIELD

Embodiments of the present invention are generally related to the synthesis of nanoalloys and core/shell nanowires, and are specifically related to methods of making $PbSe_xY_{1-x}$ nanoalloys and PbSe/PbY core/shell (Y=S, Te) nanowires.

BACKGROUND

Nanostructures (e.g., semiconductor nanostructures) provide unique optical, physical and electrical properties, which makes them the main building blocks in various devices such as electronic, photonic, thermoelectric and sensor based devices. Due to the numerous benefits provided, continual efforts are being made develop new structures (e.g., semiconductor nanostructures) with nanoscale dimensions; however, controlling the dimensions and the shape of the nanostructures remains a challenge. When controlled, the nanostructures may improve the optical and physical properties of semiconductors by changing the band gap in the strong confinement region, where one of the dimensions is smaller than the corresponding excitonic Bohr diameter.

Semiconductor nanowires in the form of alloys or core/shell systems may be utilized as materials for semiconductors and be operable to yield various band gap energies. Also, Pb-chalcogenide materials have been identified as effective nanostructures. For example, Pb-chalcogenide materials are often utilized in thermoelectric devices because of their low heat conductivity.

Accordingly, improved nanoalloys, as well as improved methods of making these nanoalloys are desirable for use in semiconductor nanostructures.

SUMMARY

According to one embodiment, a method for producing $PbSe_xY_{1-x}$ nanowire alloys where Y=S or Te is provided. The method comprises the steps of providing PbSe nanowires, producing a PbY solution by mixing a Pb precursor solution with a Y precursor solution, adding the PbSe nanowires to an alloy growth solution at ambient temperature, heating the growth solution to a temperature of at least about 150° C. after the addition of PbSe nanowires, and producing the $PbSe_xY_{1-x}$ nanowire alloy by adding the PbY solution to the heated growth solution According to another embodiment, a method for producing nanowires comprising a PbSe core and a PbS shell is provided. The method comprises providing a core/shell growth solution comprising PbSe nanowires, heating the core/shell growth solution to a temperature sufficient to produce a PbS shell over the PbSe nanowires, adding a Pb precursor solution to the core/shell growth solution; and adding an S precursor solution to the core/shell growth solution after the addition of the Pb precursor to produce nanowires comprising a PbSe core and a PbS shell.

According to yet another embodiment, a method for producing nanowires comprising a PbSe core and a PbTe shell is provided. The method comprises the steps of providing a Pb precursor solution, adding a Te precursor solution to the Pb precursor solution to produce a PbTe solution, providing a core/shell growth solution heated to a temperature of about 150° C., wherein the core/shell growth solution comprises PbSe nanowires, and adding the PbTe solution to the core/shell growth solution to form nanowires comprising a PbSe core and a PbTe shell.

These and additional features provided by the embodiments of the present invention will be more fully understood in view of the following detailed description, in conjunction with the drawings.

BRIEF DESCRIPTION OF THE DRAWINGS

The following detailed description of specific embodiments of the present invention can be best understood when read in conjunction with the drawings enclosed herewith.

Figure 1A:
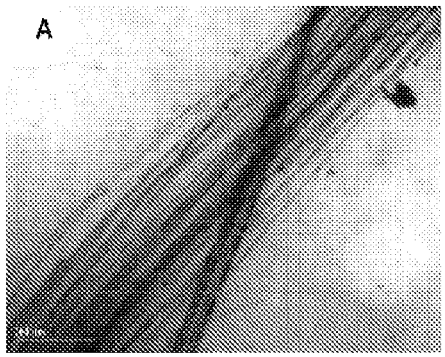
FIG. 1A is a Transmission Electron Microscopy (TEM) micrograph illustrating a PbSe core nanowire prior to the formation of a ternary $PbSe_{0.4}S_{0.6}$ alloy shown in FIG. 1B, according to one or more embodiments of the present invention.

The embodiments set forth in the drawings are illustrative in nature and not intended to be limiting of the invention defined by the claims. Moreover, individual features of the invention will be more fully apparent and understood in view of the detailed description.

DETAILED DESCRIPTION

Embodiments of the present invention are directed to methods of making $PbSe_xY_{1-x}$ alloy nanowire and PbSe/PbY core/shell nanowires, where Y=S or Te. As used herein, an "alloy" is a structure comprising a mixture of one or more metal elements. As used herein, a "core/shell" is a structure comprising a "core" metal based material and at least one separate coating layer ("the shell") thereon, wherein the shell may comprise the same or a different composition than the core composition. As will be shown below, the processing steps can dictate whether the product is in the form of an alloy nanowire or in the form of a core/shell nanowire.

Figure 7:
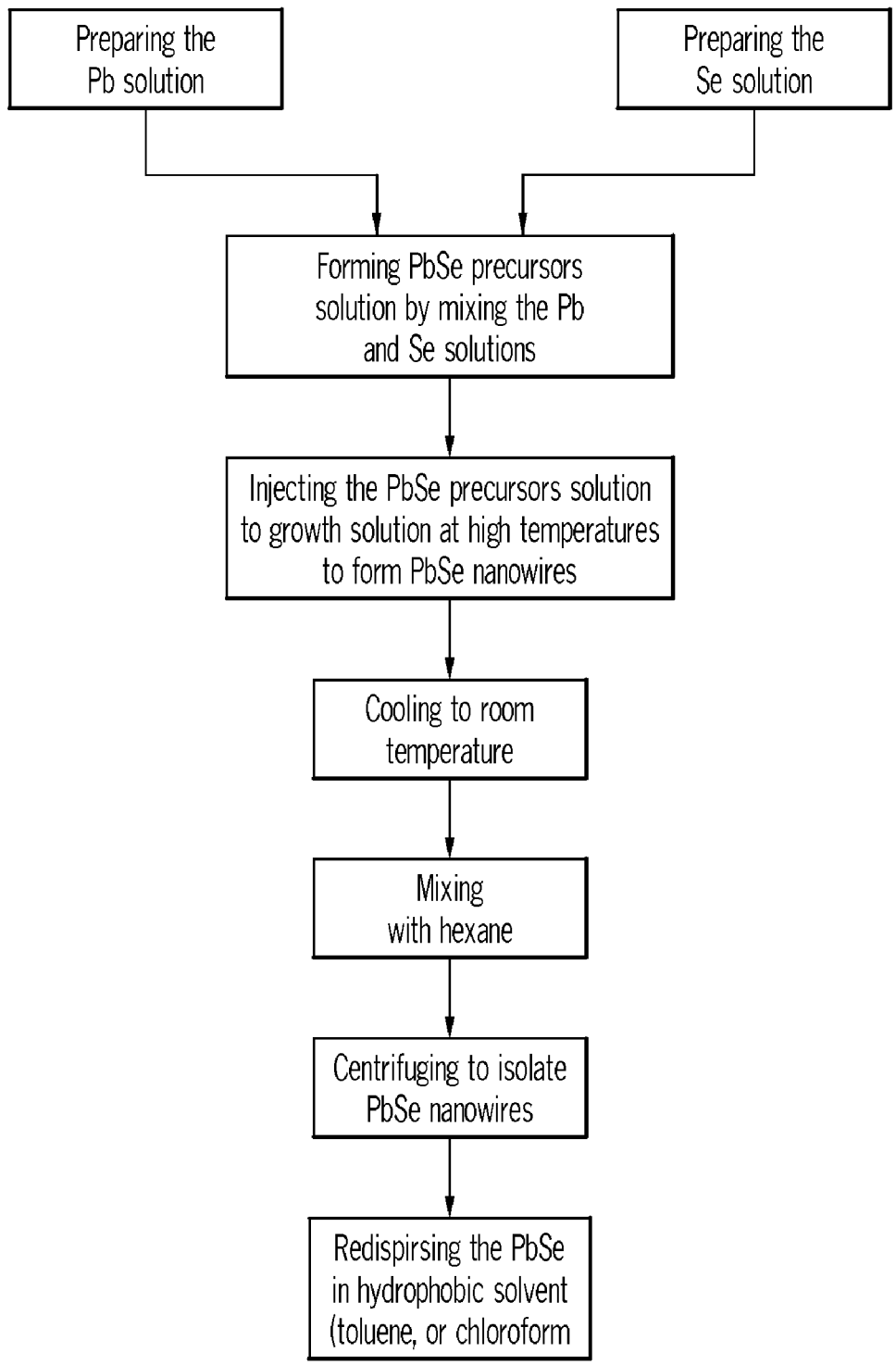
FIG. 7 is a flow chart illustrating the method of producing PbSe nanowires.
Figure 8:
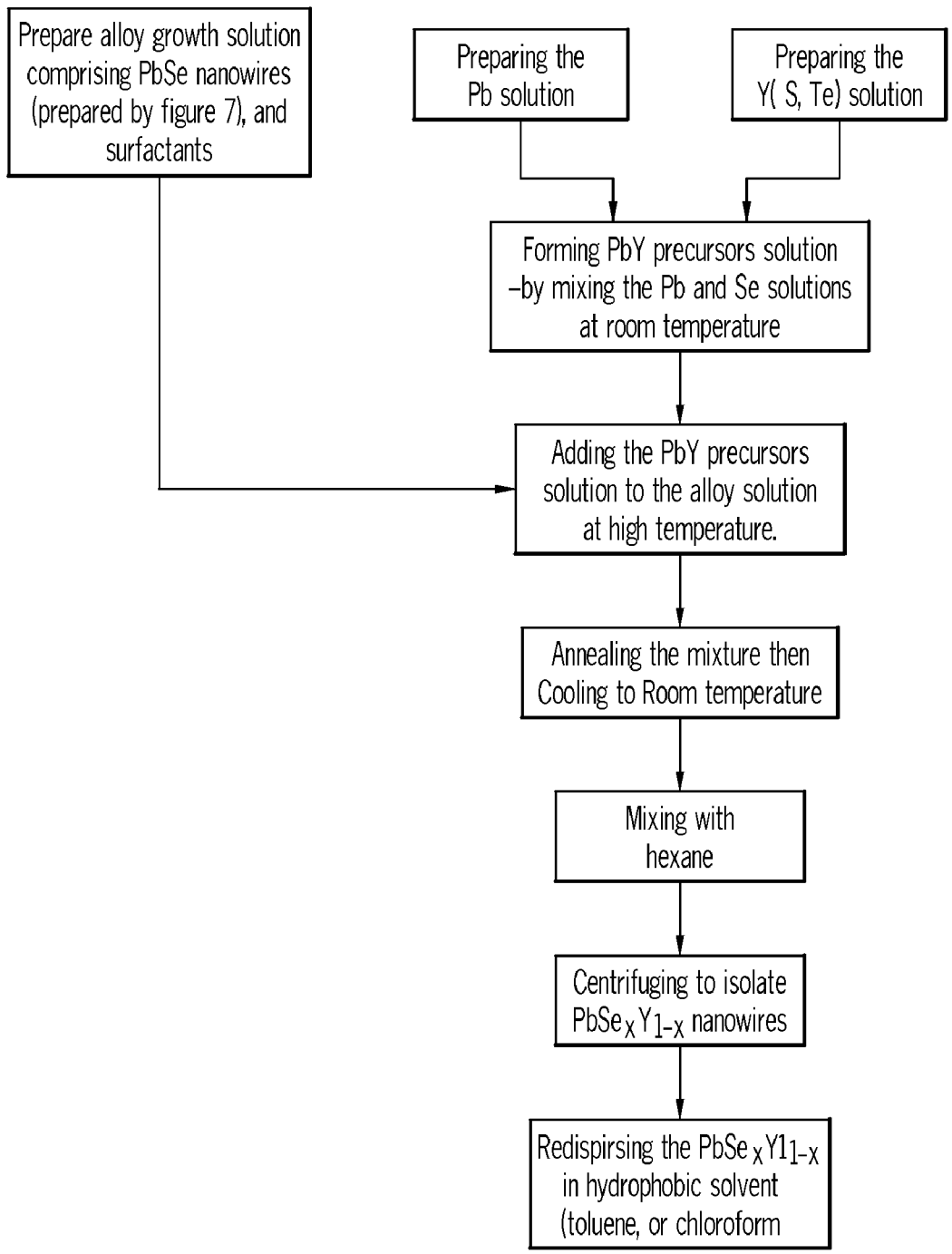
FIG. 8 is a flow chart illustrating the method of producing $PbSe_xY_{1-x}$ (Y=Te or S) alloys, according to one or more embodiments of the present invention.

Referring generally to the flow charts of FIGS. 7 and 8, the methods for producing PbSe$_x$Y$_{1-x}$ alloys can include the initial steps of preparing a PbSe nanowire and a PbY solution (Y=S or Te). As shown in FIG. 8, PbSe nanowires may be produced by mixing a Pb precursor solution with a Se precursor solution, in conjunction with additional treatment steps.

Referring to FIG. 7, the PbSe nanowire synthesis may include a Pb precursor solution comprised of 0.76 g of lead acetate trihydrate and 2 mL of oleic acid dissolved in 10 mL of diphenyl ether (DPE). This Pb precursor solution can be heated to 150° C. for at least 30 minutes in argon atmosphere to form a lead oleate complex. Then, the solution can be then dried. After about 30-40 min, the solution can be cooled to 60° C., and mixed with a selenium (Se) solution comprising, for example, 4 mL of 0.167 M TOPSe solution in tri-octyl phosphine (TOP). The Se solution can be added slowly to prevent PbSe nucleation. The PbSe solution can then be injected under vigorous stifling into a heated growth solution (e.g., 250° C.) containing 0.2 g of Tetradecyl phosphonic acid (TDPA) dissolved in 15 mL of DPE. The growth solution can be purified by heating to 180° C. After about 50 s of heating, the reaction mixture can be cooled to room temperature using a water bath. The crude solution can then be mixed with an equal volume of hexane. The nanowires can then be isolated by centrifugation at 6000 rpm for 5 min. The precipitated product from the centrifuge can be re-dispersed in chloroform or toluene for further characterization. FIG. 1A provides a TEM micrograph illustration of the PbSe nanowires produced by the foregoing synthesis method. The diameter of produced PbSe nanowires can vary from 4 nm up to 15 nm, with a length of up to 50 micrometers. It should be understood, however, that the foregoing embodiment for preparing the PbSe nanowires is exemplary and other methods are contemplated for producing PbSe nanowires.

To prepare the PbY solution as shown in FIG. 8, a Pb precursor solution is mixed with a Y precursor solution. Like above, the Pb precursor solution may comprise a lead oleate complex formed from a mixture of lead acetate trihydrate, oleic acid, and diphenyl ether (DPE). The Y precursor solution may include S or Te in a solution comprising tri-octyl phosphine (TOP), or suitable solvents such as Octadecene, Tributyl phosphine, Triphenyl phosphine. In an experimental example, an S precursor solution can be prepared by dissolving 0.1 g of S in 0.5 ml of TOP and heating the solution to 50° C. for 10 minutes before cooling to room temperature. The Pb precursor solution can be prepared using 0.2 g of lead acetate trihydrate, 2 ml of TOP, 2 ml of DPE and 1.5 ml of oleic acid. The Pb solution can be heated to 150° C. for 30 minutes and then cooled to room temperature. At room temperature, the S precursor solution can be added to the Pb precursor solution under stifling. Other compositions and processing steps for the production of Pb and Y precursor solutions are contemplated herein.

After the PbSe nanowires are prepared, the PbSe nanowires can be delivered to an growth solution. They can act as a medium for the reaction of the PbSe nanowires and the PbY solution. The growth solution may comprise TOP and DPE, or other suitable materials. As mentioned before, the trialkyl phosphine, or trialkyl amine may be used as solvents. These solvents are compatible to the nanowire surface (via a Lewis acid/base reaction mechanism) and can also dissolve the chalcogenide metals. When adding the PbSe nanowires, the growth solution may be maintained at ambient temperature; however, other suitable temperatures are contemplated herein. In one experimental example, the growth solution may comprise 2 ml of DPE and 2 ml TOP, which is heated at 180° C. for 20-25 minutes and then cooled to room temperature before adding 30 mg of PbSe nanowires.

After the PbSe nanowires are added to the growth solution, the growth solution is heated to a temperature of at least 150° C., (e.g., the PbY solution described above) or in one embodiment, between about 190 to about 200° C. Subsequently, the PbY solution is added. The PbY may be added slowly to prevent self-nucleation, or the formation of undesirable crystal structures. In one embodiment, a PbS solution was added dropwise at a rate of about 0.25 ml/min.

Additional treatment steps are contemplated for the formation of the PbSe$_x$Y$_{1-x}$ alloy. For example, the growth solution can be annealed for 10 minutes and then cooled to room temperature. The alloy product can then be separated by adding hexane and centrifuging at 6000 rpm for 5 min.

Figure 1B:
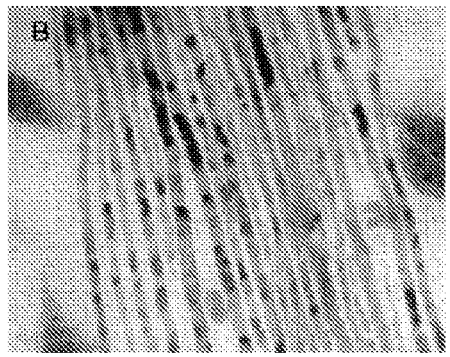
FIG. 1B is a TEM micrograph illustrating a $PbSe_{0.4}S_{0.6}$ alloy, according to one or more embodiments of the present invention.

In accordance with the exemplary methods provided above, a ternary PbSe$_x$Y$_{1-x}$ alloy may be formed and may comprise a composition of PbSe$_{0.4}$S$_{0.6}$, such as shown in the TEM micrograph of FIG. 1B. Other suitable compositions of PbSe$_x$Y$_{1-x}$ are also contemplated. The inventors have recognized that the above described processing steps facilitate diffusion between the PbSe core and the PbY shell, and thus produce a ternary nanoalloy, not a core/shell nanowire. The diffusion process may be divided into two stages. In the first stage, addition of the PbY (e.g., Y=S) solution to the PbSe nanowire solution results in the growth of the PbS as a shell. In the second stage, multiple factors (i.e. high temperature, small diameter of the PbSe core and the small lattice mismatch between the PbSe core and PbY) facilitate diffusion between the core and shell to form the alloy. For example, heating the growth solution prior to addition of the PbS solution facilitates greater particle movement between the PbSe nanowire core and PbS shell. Since smaller diameter nanowires are more reactive and less energetically stable, minimizing the diameter of the PbSe nanowires also aids diffusion. In one embodiment, such as that described above, the PbSe nanowires have a diameter between about 4 and 15 nm. Furthermore, the small lattice mismatch between the PbSe core and the PbY shell ($D_{PbSe}/D_{PbS} \sim 3\%$ and $D_{PbSe}/D_{PbTe} \sim 5\%$; where D is the lattice constant of the crystals) facilitates further diffusion.

Figure 4:
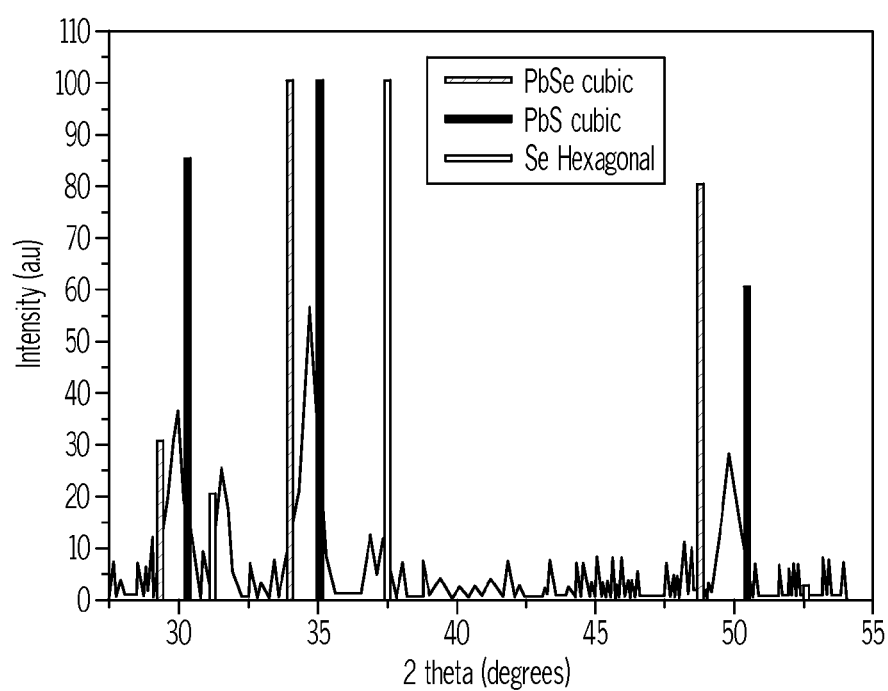
FIG. 4 is a powder X-Ray Diffraction (XRD) pattern of a portion of the $PbSe_{0.4}S_{0.6}$ alloy of FIG. 1B, according to one or more embodiments of the present invention.
Figure 5:
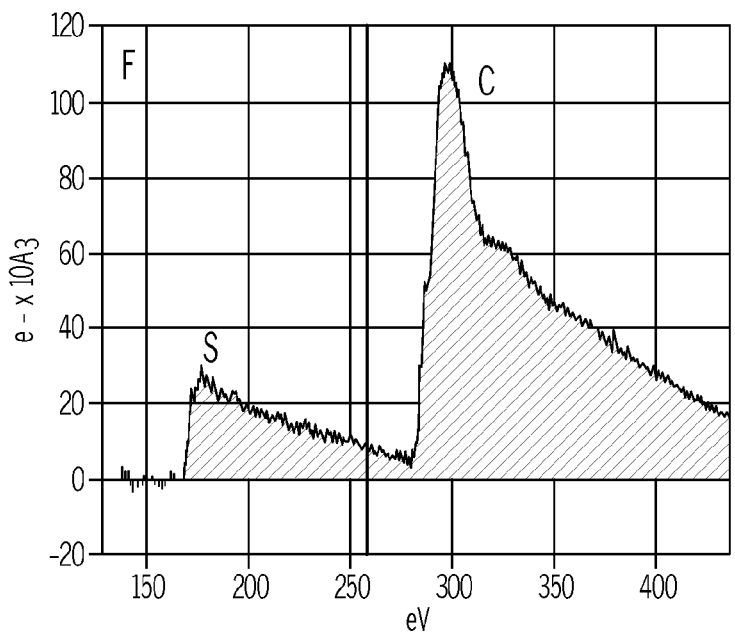
FIG. 5 is an Electron Energy Loss Spectroscopy (EELS) spectrum of a portion of the $PbSe_{0.4}S_{0.6}$ alloy of FIG. 1B, according to one or more embodiments of the present invention.

To demonstrate the alloys formed by methods described herein, such as the PbSe$_{0.4}$S$_{0.6}$ alloy, FIGS. 4 and 5 are provided. As illustrated in the EDX (Energy Dispersive X-ray Spectroscopy) spectrum of FIG. 4, the intensity pattern differs from both cubic PbSe and cubic PbS, and is disposed between the peaks of the cubic PbSe and cubic PbS. This pattern demonstrates that the alloy product does not comprise distinct PbSe and PbS compositions, which would be present in core/shell configuration. As shown in the Electron Energy Loss Spectroscopy (EELS) spectrum of FIG. 5, S was identified at 165 eV. Furthermore, as the PbSe nanowires were converted into PbSe$_{0.4}$S$_{0.6}$ alloys, a change in diameter from 6 nm to about 10 nm was observed due to the addition of the PbS materials.

Figure 9:
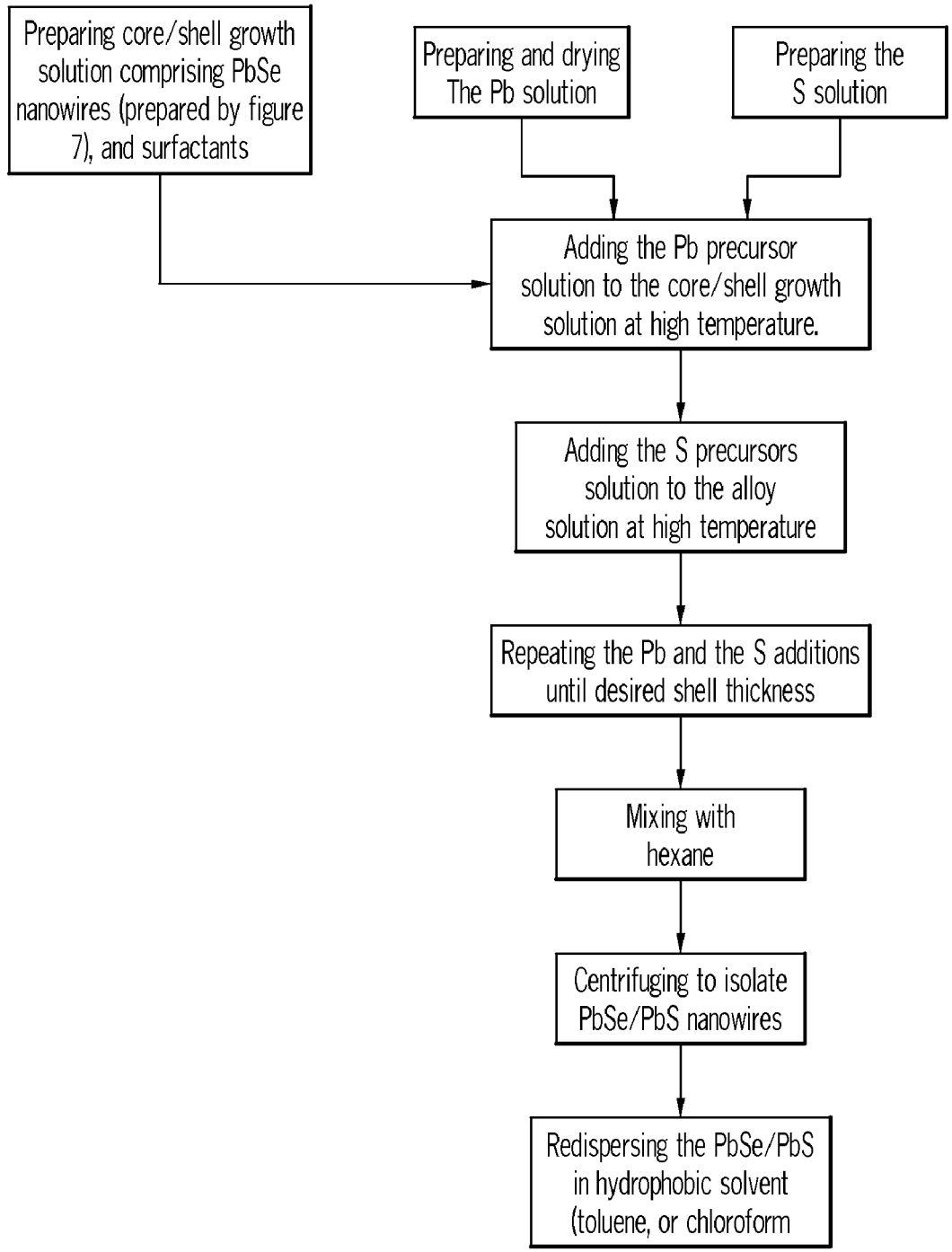
FIG. 9 is a flow chart illustrating the method of producing PbSe/PbS core/shell alloys, according to one or more embodiments of the present invention.

In addition to the methods of forming alloys, the present invention is also directed to core/shell synthesis, for example, methods for producing core/shell nanowires comprising a PbSe core and a PbS shell are contemplated. Referring to FIG. 9, the shell synthesis is based on the Successive Ion Layer Adsorption and Reaction (SILAR) approach, an approach for growing shells over core materials with nanoscale dimensions. In the SILAR approach, growth of the shell is designed to grow one monolayer at a time by alternating the addition of cationic (Pb precursor solution) and anionic (S precursor solution) precursors into a core/shell growth solution comprising PbSe nanowires. The core/shell growth solution may also comprise solvents such as tri-octyl phosphine (TOP) and diphenyl ether (DPE). In accordance with the methods, Pb precursor solution is added to the core/shell growth solution. Like the above methods of forming the alloy, the Pb precursor solution may comprise a lead oleate complex. Subsequently, an S precursor solution (e.g., S in a TOP solution) is added to the core/shell growth solution which contains the PbSe nanowires and Pb precursor solution. Then, the core/shell growth solution is heated to a temperature sufficient to produce the PbS shell. In one embodiment, the PbS shell can be produced by heating the core/shell growth solution to a temperature of about 130° C. By using lower heating temperatures than the methods of forming the alloys described above, the amount of diffusion between core and shell is minimized and the core/shell configuration is thereby maintained. In further embodiments, the addition of Pb and S precursor solution may be repeated multiple to increase the thickness of the PbS shell. Other treatment steps are contemplated herein.

Figure 2A:
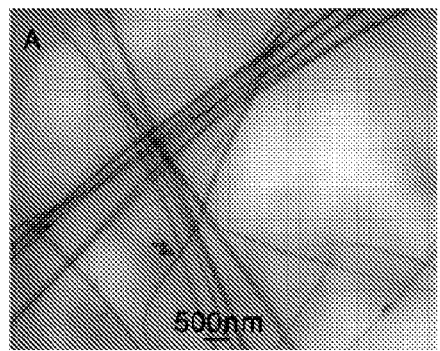
FIG. 2A is a TEM micrograph illustrating a PbSe core nanowire prior to the coating of a PbS shell as shown in FIG. 2B, according to one or more embodiments of the present invention.
Figure 2B:
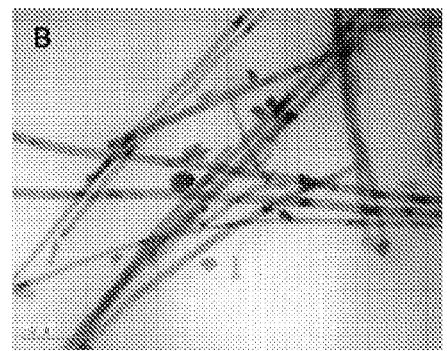
FIG. 2B is a TEM micrograph illustrating a PbSe core with a PbS shell thereon, according to one or more embodiments of the present invention.

In an experimental example, the synthesis of PbSe/PbS core/shell nanowires was carried out by slowly adding 0.3 ml of a Pb precursor solution and 0.1 ml of an S precursor solution (0.063 g/2 ml TOP) to a core/shell growth solution comprising PbSe nanowires. The Pb precursor solution is added first and then the S precursor solution is added at a rate of 0.3 ml/min after a waiting time of three minutes. In addition to PbSe nanowires, the core/shell growth solution contained 2 ml of DPE and 2 ml of TOP and was purified by heating to 200° C. for 25 minutes. After addition of the Pb and S precursors, the solution was reheated to 130° C. The PbSe/PbS core/shell nanowire product, as shown in FIG. 2B, had a thickness of about 11 nm. The inventors recognize that the thickness of the shell, and thereby the thickness of the nanowire may be adjusted by modifying the concentration of the precursors.

Figure 6:
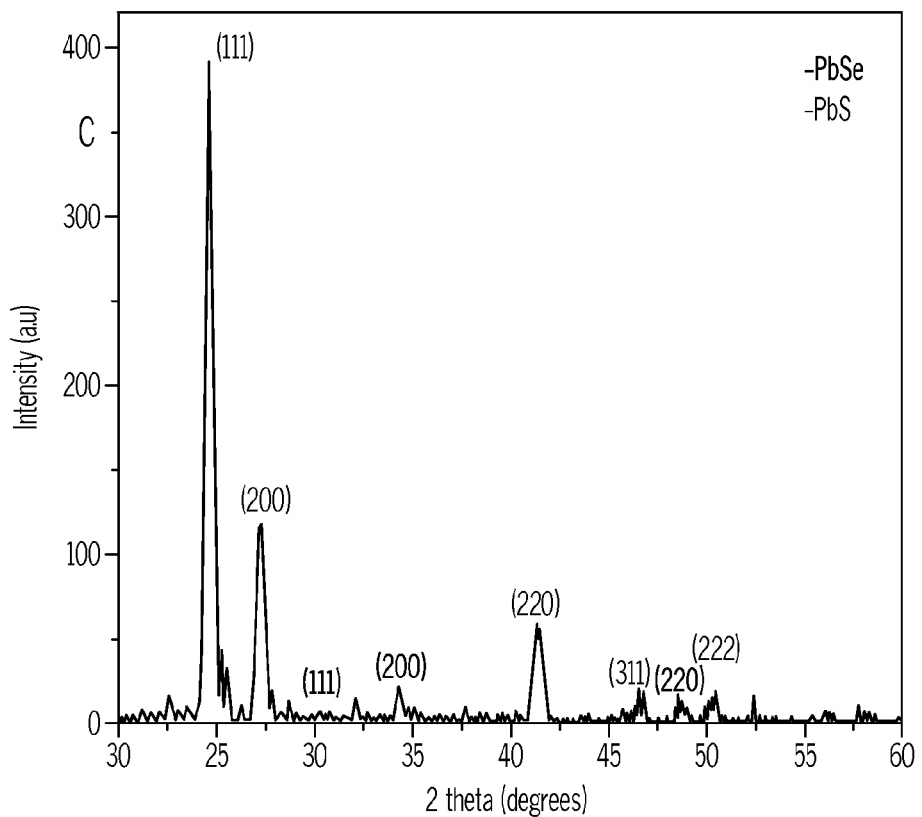
FIG. 6 is a powder (XRD) pattern of the PbSe/PbS core/shell of FIG. 2B, according to one or more embodiments of the present invention.

FIG. 6 is an XRD spectrum of core/shell nanowire manufactured pursuant the forgoing example. As shown, two sets of peaks are identified in the XRD pattern thus indicating the existence of two different crystal structures (i.e., the PbSe and PbS crystal structures). The XRD measurement was carried out after purifying the sample and extracting the PbSe/PbS core/shell nanowires. The sample was washed and purified by size selective precipitation (PbS nanocrystals were formed in the shell growth).

Figure 10:
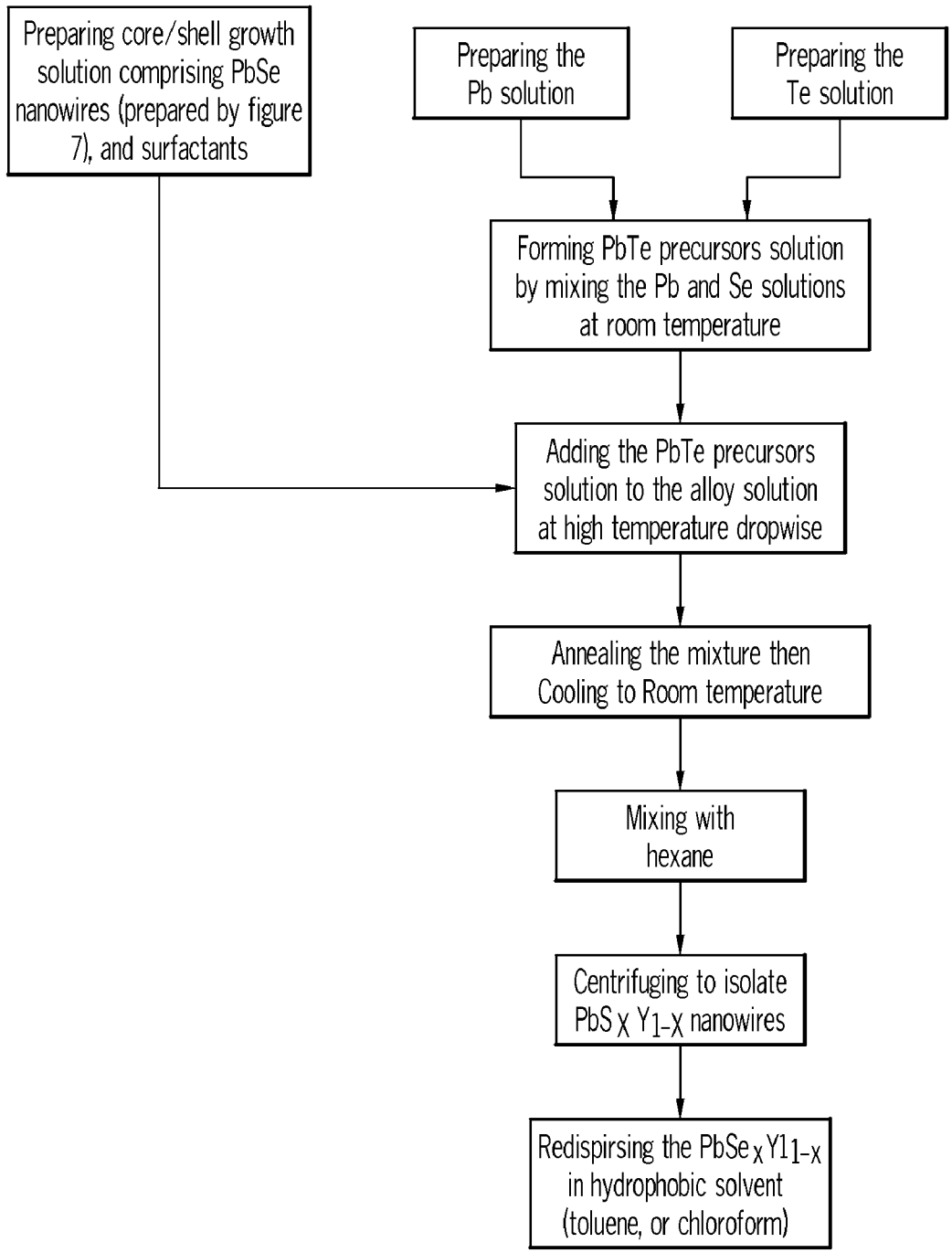
FIG. 10 is a flow chart illustrating the method of producing PbSe/PbTe core/shell alloys, according to one or more embodiments of the present invention.

Furthermore, the methods of the present invention are also directed to producing core/shell nanowires comprising a PbSe core and a PbTe shell. Referring to FIG. 10, the synthesis of the PbSe/PbTe core/shell materials is essentially a two-step synthesis, wherein the PbSe nanowires were prepared first and the shell was grown in a second stage. The PbSe nanowire core may be prepared according to the synthesis method described above and as shown in FIG. 7. To prepare the PbTe shell, a Pb precursor solution is prepared and then a Te precursor is added to the Pb precursor to produce a PbTe solution. Similar to above, the Pb precursor solution may comprise a lead oleate complex, and the Te precursor may comprise Te and TOP. The Te precursor may be added dropwise, or in low concentration to prevent self-nucleation i.e. the formation of PbTe nanocrystals instead of a PbTe shell. As described below, self-nucleation is a more significant problem for PbSe nanowires of greater surface area.

After forming the PbTe solution, the PbTe solution is added to a core/shell growth solution comprising PbSe nanowires in order to form PbTe shells over the PbSe nanowires. The core/shell growth solution may be heated to a temperature above 150° C., or specifically about 190° C. Like the above methods, the core/shell growth solution may comprise TOP and DPE.

In an experimental example, the growth of the shell was carried out by addition of 0.07 mg of Pb (the same Pb precursor solution used for the alloy) and 0.063 g of Te in 2 ml TOP. The Pb solution was dried by heating to 140° C. for 10 minutes, and then cooled. After cooling to room temperature, the Te solution was added dropwise. This PbTe solution was then slowly added to the core/shell growth solution (at 190° C.), which contained 2 ml of TOP, 2 ml of DPE and 20 mg of PbSe nanowires. After adding all of the precursors, the reaction was annealed at 130° C. for another 7 minutes before cooling to room temperature. To separate the product, 2 ml of toluene and 2 ml of ethanol were added to the solution, which was then centrifuged for 5 minutes.

Figure 3:
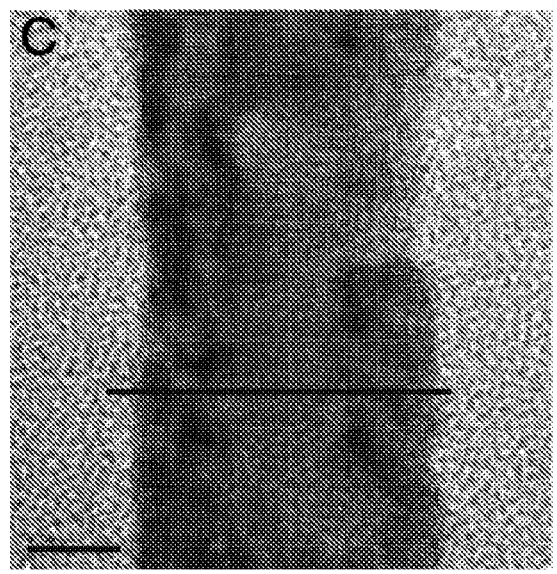
FIG. 3 is a High Resolution Transmission Electron Microscopy (HRTEM) micrograph illustrating a PbSe core with a PbTe shell, according to one or more embodiments of the present invention.

The experimental example above produced a PbSe/PbTe core/shell nanowire as shown in FIG. 3. The PbSe/PbTe core/shell nanowire comprised a final thickness of 40 nm, whereas the thickness prior to the addition of the PbTe shell coating is ~8 nm. The shell thickness may be adjusted by changing the concentrations of the Pb and Te precursor solutions. Consequently, the PbTe shell may comprise a thickness of about 5 to about 30 nm, and the core/shell nanowire may comprise a thickness of about 10 to about 45 nm. Shell thickness impacts the physical and optical properties of the PbSe cores, thus the shell thickness may be optimized to produce the best nanowire performance.

As discussed above, the coating of the PbTe shell material on the PbSe is carried out at higher temperature compared with the PbS shell. In specific examples, the PbS shell is formed in a core/shell growth solution heated to 130° C., whereas the PbTe shell is formed in a core/shell growth solution heated to 190° C. This is due in part to the higher lattice mismatch for PbTe (PbTe, 5.5% vs. PbS 3.0%). Due to this higher lattice mismatch, higher temperatures are required to grow a uniform PbTe shell over the PbSe core. The processing steps are also optimized to combat unwanted side reactions (e.g., self-nucleation of the PbTe). When PbSe nanowires have a large surface area, shell formation may be difficult, due to the possibility of forming clusters and islands of the shell material on the core surface. In the foregoing experimental example, the inventor minimized potential unwanted cluster formation by annealing the solution for 7 minutes in 130° C. to form a uniform and single crystalline shell coating.

For the purposes of describing and defining the present invention it is noted that the term s "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein and illustrated in the figures, it is contemplated that the present invention is not necessarily limited to these aspects of the invention.

What is claimed is:

1. A method for producing $PbSe_xY_{1-x}$ nanowire alloys where Y=S or Te comprising:
   providing PbSe nanowires;
   producing a PbY solution where Y=S or Te by mixing a Pb precursor solution with a Y precursor solution;
   adding the PbSe nanowires to an growth solution at ambient temperature;
   heating the growth solution after the addition of PbSe nanowires to a temperature of at least about 150° C.; and
   producing $PbSe_xY_{1-x}$ nanowire alloys by adding the PbY solution to the heated growth solution comprising PbSe nanowires.

2. The method of claim 1 further comprising isolating the $PbSe_xY_{1-x}$ nanowire alloys from the heated growth solution by centrifugation.

3. The method of claim 2 further comprising heating the growth solution, cooling the growth solution, adding hexane to the growth solution or combinations thereof prior to isolating the PbSeY nanowires by centrifugation.

4. The method of claim 1 wherein the growth solution, after the addition of PbSe nanowires, is heated to a temperature of from about 190° C. to about 200° C.

5. The method of claim 1 wherein the PbY is added dropwise at a rate to the growth solution.

6. The method of claim 1 wherein the growth solution comprises tri-octyl phosphine (TOP) and diphenyl ether (DPE).

7. The method of claim 1 wherein the Y precursor solution comprises sulfur (S) or telluride (Te), and trioctyl phosphine (TOP).

8. The method of claim 1 wherein the $PbSe_xY_{1-x}$ nanowire alloys comprise a composition of $PbSe_{0.4}S_{0.6}$ and this could be controlled by controlling the amount of PbS that is added to the PbSe nanowires.

9. The method of claim 1 wherein the $PbSe_xY_{1-x}$ nanowire alloys comprise a thickness of about 10 nm.

* * * * *